T. B. Brown & J. N. Dinsmore. Mach. for Making Wedges.

No. 119,306.
Patented Sep. 26, 1871.

Witnesses:
E. Wolff
Wm. H. L. Smith

Inventors:
T. B. Brown
J. N. Dinsmore
Per _____ Attorneys.

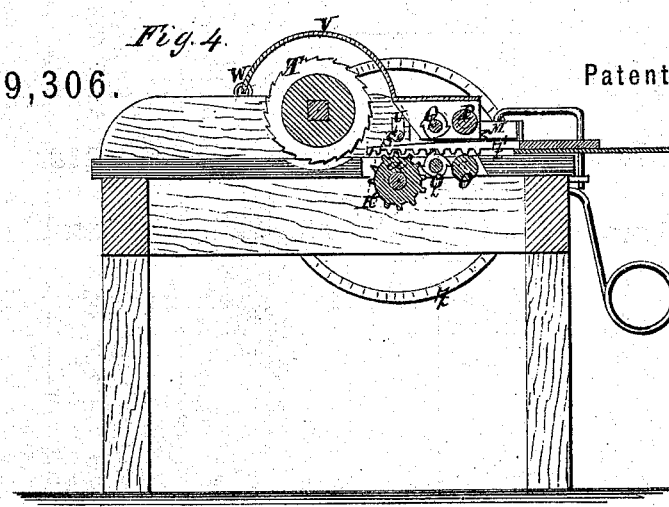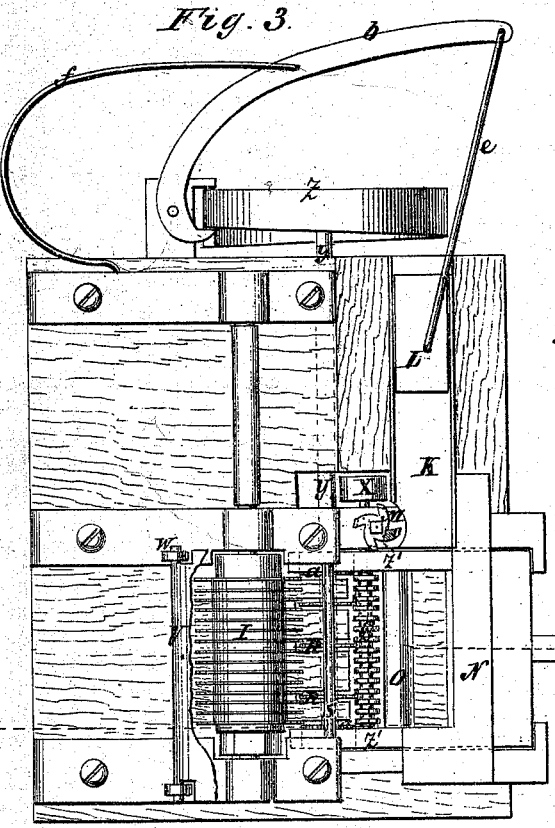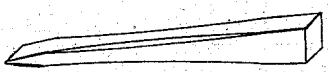

UNITED STATES PATENT OFFICE.

THOMAS B. BROWN AND JOSHUA N. DINSMORE, OF KENDALL'S MILLS, MAINE.

IMPROVEMENT IN MACHINES FOR MAKING WEDGES.

Specification forming part of Letters Patent No. 119,306, dated September 26, 1871.

*To all whom it may concern:*

Be it known that we, THOMAS B. BROWN and JOSHUA N. DINSMORE, of Kendall's Mills, in the county of Somerset and State of Maine, have invented a new and Improved Machine for Making Wedges; and we do hereby declare that the following is a full, clear, and exact description thereof, which will enable others skilled in the art to make and use the same, reference being had to the accompanying drawing forming part of this specification.

Our invention consists in peculiar means for manufacturing wedges, as hereinafter fully described, and subsequently pointed out in the claims.

Figure 1:
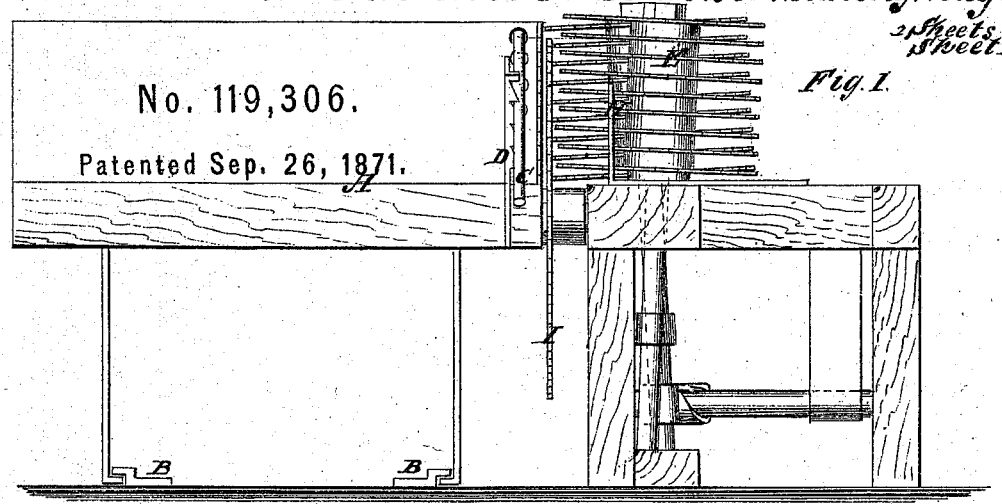
Figure 2:
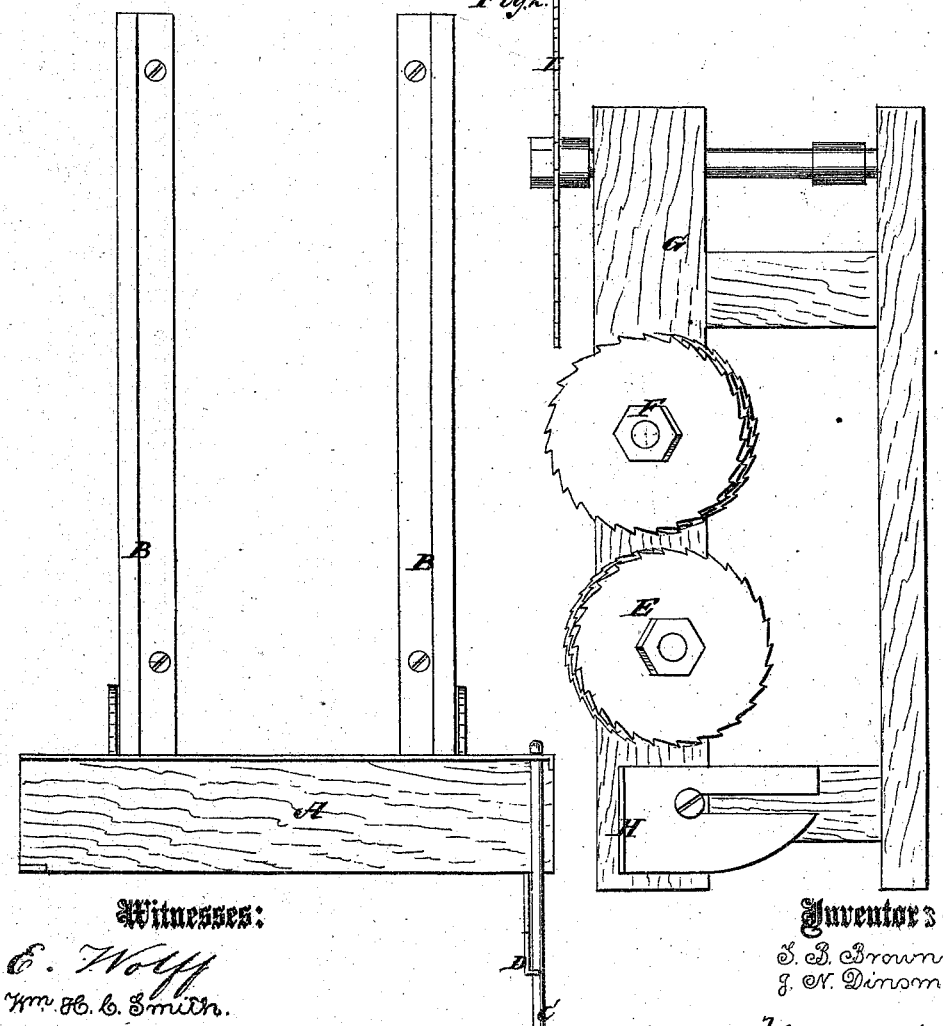

Figure 1 is a front elevation of the machine for holding the log and sawing the oblique cuts in the end to form the wedges; also, to cut the wedges off. Fig. 2 is a plan view of the same. Fig. 3 is a plan view of the pointing, chamfering, and slitting apparatus. Fig. 4 is a sectional elevation of Fig. 3 on the line $x\ x$. Fig. 5 is a perspective view of the completed wedge, and Fig. 6 is an elevation of the sharpening-cutter.

Similar letters of reference indicate corresponding parts.

A is the log-holding table, arranged to slide back and forth along the ways B, and provided with a binding-lever, C, and notched catch-bar D therefor. E and F represent two gangs of circular saws mounted side by side in a frame, G, fronting the end of table A. They are arranged on shafts slightly inclined from the vertical line in opposite directions so that the oblique planes of each gang of saws cross each other, so that the log, being adjusted with its end against the adjustable gauge H, and shoved along past both gangs of saws, will be cut into wedges, the heads and points of which are alternately together, and being pushed along against the cut-off saw I, will be separated from the log. These wedges, so formed, and being as broad as the log will make, are placed in a feeding-trough, K, in front of a pusher, L, and pushed along past the rotary sharpening-tool M, the cutters of which are crotched horizontally, so that one part works above the point of the wedge and the other below, as clearly indicated in Fig. 6, reducing it to a point as it moves along in front of the pusher N, by which it is forced along point foremost between the rollers O and P, the grooving or chamfering rotary cutters P, and thence over the rotary feeders R, under the rod S, to the gang of slitting cutters T, where they are completed, the said saws slitting the wide wedges along the grooves formed by the cutters into narrow wedges. The rod S is provided with springs U above it, to allow it to rise as the wedges moving forward point first increase in thickness; and the roller P, also the upper grooving-cutters, are mounted in bearings applied to the cover V for the saws T, which are hinged at W, so that they may rise and fall also. The rotary cutters Q are each provided with a pulley, X, for being driven by a belt. The feeders R are mounted on the shaft Y of a slow-moving cam-wheel, Z, driven by a belt, and this shaft also works the pushers N and L, the former by the toothed rack-bars Z' and pinion $a$, and the latter by the cam-wheel Z, lever $b$, and constructing-rod $e$. Each pusher is provided with a spring, $f$, which may be of any kind for drawing it back.

Having thus described our invention, we claim as new and desire to secure by Letters Patent—

1. The rotary tool M, having a series of crotched cutters arranged to work above and below the wedge-blank as it is fed along at right angles thereto, for the purpose specified.

2. The combination of pusher L, trough K, pusher N, and guides O P, arranged, as described, to enable the blank to be successively presented to the sharpening and chamfering-tools, as set forth.

3. The chamfering-cutters Q and sharpening-tool M, when combined and arranged in a machine to receive the wedge-blank, and successively act upon it, in the manner specified.

4. The feeder R and spring-rod S, when arranged between the tools Q Q and T, as and for the purpose specified.

5. The arrangement, with the cam-wheel Z and the slide L, of the lever $b$ and rod $e$, substantially as specified.

6. The combination of the chamfering-cutters Q Q and slitting gang-saw T, substantially as and for the purpose specified.

7. In a wedge-making machine, the combination of sharpening-tool M, chamfering-cutters Q Q, and slitter T, when arranged to receive and operate upon the blank successively, in the manner specified.

THOMAS B. BROWN.
JOSHUA N. DINSMORE.

Witnesses:
ALVIN PINKHAM,
ELHANAN W. McFADDEN.